United States Patent Office 3,427,233
Patented Feb. 11, 1969

3,427,233
ELECTROLYTIC POLYMERIZATION OF MALEIC ANHYDRIDE
Chappelle C. Cochrane, Maywood, Ill., assignor to Nalco Chemical Company, Chicago, Ill., a corporation of Delaware
No Drawing. Filed Mar. 18, 1966, Ser. No. 535,317
U.S. Cl. 204—59                                                   8 Claims
Int. Cl. B01k 1/00; C08f 3/48

The present invention relates to an electrochemical polymer synthesis. More specifically, the instant invention is concerned with a method of homopolymerizing maleic anhydride by electrochemical means.

Until just recently, it was thought impossible to homopolymerize maleic anhydride. Experimental work toward this end had proved to be unsuccessful for the most part. However, as reported in Polymer Science, vol. 1, pages 1123–1136 (1963) by Lange et al. the homopolymerization of maleic anhydride can now be effected by use of gamma radiation. The disclosed technique, however, has one important drawback in that to achieve high percentage conversions, the reaction must be run for a relatively long time, for example, in the neighborhood of 1 day or so. Also, relatively expensive radiation equipment must be employed, and safety procedures carefully followed. It would be of benefit to the art if a simple, rapid and efficient technique of homopolymerizing maleic anhydride were discovered. If such procedure could be carried out in a relatively short time, and at high conversion rates, the invention would find ready acceptance, particularly when utilized as a large scale industrial process.

It therefore becomes an object of the invention to provide an improved method of homopolymerizing maleic anhydrides.

Another object of the invention is to provide an efficient, yet relatively rapid process of homopolymerizing maleic anhydride by electrochemical techniques.

Other objects will appear hereinafter.

In accordance with the invention, it has been discovered that maleic anhydride may be homopolymerized by electrochemical means. In its broadest aspects, the invention comprises a method of homopolymerizing maleic anhydride by first providing two solutions, one of which comprises a non-aqueous organic solvent and the other maleic anhydride monomer dissolved in said organic solvent. The polymerization is then simply and easily conducted by electrolyzing the solutions by using an appropriate anode and cathode separated from one another by being immersed in a divided cell or separate compartments containing said solutions and then recovering the polymer. The electrolytic preparation itself is effected by passing a current from anode to cathode. Following this method enables one to rapidly homopolymerize maleric anhydride to nearly 100% total conversion.

In a greatly preferred embodiment, the electrolyte solutions also contain a supporting electrolyte. The supporting electrolyte may be chosen from a wide variety of known organic and inorganic materials capable of conducting current in solution. Such materials as lithium chloride, lithium nitrate, trialkyl amine salts, tetraalkyl ammonium quaternaries, etc. are useful. Thus, for example, tetraethyl ammonium benzene sulfonate, tetraethyl ammonium p-toulene sulfonate, tetraethyl ammonium bromide, tetraethyl ammonium iodide and tetraethyl ammonium perchlorate may be utilized with much success. Depending upon reaction conditions, the electrolyte may be present in a wide range of amounts. However, it has been determined that a typical electrolytic solution will contain 5–30% by weight of electrolyte, and more preferably 10–20% by weight, based on total solution weight.

Again, the solvent for the electrolytic system may vary over a wide range of materials. Since the electrolytic preparation should be run under essentially anhydrous conditions, it is important that the organic solvent employed be free of any traces of water. Also, the solvent itself should be aprotic, that is, it should not be a material which tends to give off protons with ease in presence of an electrical current, since the proton production would seriously impede the process of the invention. Preferred solvents are relatively polar in nature, and preferably have a relatively high dielectric constant. Examples of these solvating agents are dimethyl formamide, dimethyl sulfoxide, dimethylacetamide, acetic anhydride, acetonitrile, etc. However, other solvents having a lower dielectric constant may be used with little sacrifice in process efficiency. Thus, any non-aqueous solvent and preferable organic solvent may be employed which is capable of supporting ionization of a salt thereby providing an electroconductive path. The amount of solvent which may be present may again be varied over a wide range. A typical electrolytic solution contains 30–90% by weight of solvent and more preferably 40–70%.

The maleic anhydride monomer is preferably present in solution in an amount ranging from about 5 to about 50% by weight, based on total solution weight, and most preferably, 20–50% by weight.

The electrodes themselves may widely vary in their constituency. Typical anodes include platinum, gold and palladium. Cathode materials include mercury, zinc, lead and tin. In the most preferred system, platinum is employed as an anode and liquid mercury as a cathode. To carry out the process of the invention, it is only necessary to apply a current to the system and allow polymerization to proceed. For efficient results, the anode and cathode should be separated from one another by division of the reaction vessel or cell into two compartments. The anolyte and catholyte compartments may be separated by any electrically conductive material acting as a solution flow barrier such as fritted glass and like porous diaphragms.

In a preferred embodiment, an anolyte solution is first prepared comprising supporting electrolyte and solvent. This solution is then placed in a porous compartment or cup which is constructed of such a nature to allow ions of the supporting electrolyte to pass through, but does not allow monomer or polymer into the compartment. That is, the compartment should be capable of permitting passage of current but still retard the bulk flow of contacting solution. The cup may be made of any porous material such as unglazed porcelain, etc. An anode is then immersed in the anolyte solution. Surrounding the porous cup containing anolyte is the catholyte containing supporting electrolyte, solvent and monomer to be polymerized, as well as cathode. Thus, in a typical synthesis, the reaction vessel may be filled with catholyte which surrounds the anolyte enclosed in a porous cup. Excellent results are achieved when this mode of electrochemical polymerization is followed.

Depending upon any number of variables, time and temperature of reaction may vary widely. However, in typical preparations, the homopolymerization is carried out at a temperature ranging from about 20 to about 85° C. at from ¼ to about 5 hours. The reaction is considered complete when there is noted a leveling off of resistance reading, assuming the electrolyte itself is not electrolyzed. The voltage impressed between anode and cathode to produce current during the polymerization will again vary depending upon reaction conditions. In typical runs, applied voltage may range from 5 to 50 volts. Again, excellent runs have been made when the potential difference between cathode and reference electrode, as measured by a silver-silver chloride standard electrode, ranges from about −3.5 to −1. In a typical run using the above reference electrode, this potential difference will range from −1.8 to −3.0.

The resulting polymer has a molecular weight ranging from about 1000 to about 50,000, and more often ranges from 2000 to about 10,000. Such materials have been found to be excellent dispersants for a wide variety of suspended particles in aqueous medium.

It has also been determined that the electrochemical reaction should be run under neutral or basic conditions. When the pH is substantially less than 7, electrochemical reaction does not occur to any degree. Thus, the invention is not applicable to homopolymerization of maleic acid. Rather, it is important that this material be in the anhydride form.

Once the reaction is complete, the only necessary remaining step is to separate out polymer from the reaction mass solution. This may be done by a variety of techniques such as solvent precipitation and the like. Thus, in a typical preparation, the catholyte reaction mass is physically separated from the mercury cathode by decanting off catholyte. The reaction mixture is then added to an organic solvent such as toluene which tends to precipitate out the polymer. The polymer is then filtered, washed and dried.

The following are examples of typical preparations employing the techniques of the invention. It is understood, of course, that these examples are merely illustrative and are not meant to be limiting upon the scope of the invention.

Example I

During a period of about 3½ hours, an electric current was passed through a cell containing 110 ml. of mercury as cathode and a platinum anode in a porous porcelain cup containing 20 g. of tetraethylammonium p-toluenesulfonate in 30 ml. of acetonitrile. The cup was immersed in a catholyte solution consisting of 80 g. of maleic anhydride, 42 g. of tetraethylammonium p-toluenesulfonate and 150 ml. of acetic anhydride. The operation was conducted at a temperature of from 35–65°, at a cell voltage of 13–24 volts and a cathode potential of −2 volts vs. Ag-AgCl reference electrode. The amperage varied from 1.8 to 0.4 amp.

When the current was discontinued, the mercury was separated and the catholyte solution added dropwise to 800 ml. of rapidly stirred toluene. The precipitated solid was filtered, washed with methylene chloride and dried to afford 53 g. of polymer, M.P. 300°. Molecular weight of the polymer (determined osmometrically in acetonitrile) was 2600. Infrared analysis indicated the material to be anhydride containing some acid.

Example II

Following the general procedure of Example I, but using dimethylformamide as the solvent, there was obtained 50 g. of polymer.

Example III

Following the general procedure of Example II, but bubbling dry nitrogen through the catholyte during electrolysis, afforded 77 g. of polymer.

The invention is hereby claimed as follows:

1. An electrochemical method of homopolymerizing maleic anhydride monomer which comprises providing a divided cell with each compartment separated by a porous diaphragm, one compartment containing a solution comprising said monomer and a non-aqueous organic solvent capable of solubilizing said monomer, and the other compartment containing a solution comprising said solvent and conducting polymerization of said monomer by electrolyzing said solutions using an anode and cathode respectively immersed in said solutions, and recovering a polymer.

2. The method of claim 1 wherein said solutions also contain a supporting electrolyte.

3. The method of claim 2 wherein said solvent is aprotic.

4. The method of claim 1 wherein said homopolymerization is run at 20–85° C. for 1/4–5 hours.

5. An electrochemical method of homopolymerizing maleic anhydride monomer which comprises providing an anolyte solution contained in an electrically conductive porous compartment, which solution comprises a supporting electrolyte, and a non-aqueous organic solvent having immersed therein an anode electrode, which porous compartment is itself surrounded by a catholyte solution comprising said above solution additionally containing maleic anhydride and a cathode immersed therein, and effecting said polymerization by electrolyzing said anolyte and catholyte solutions by passage of current through said anode electrode, and recovering a homopolymer from said catholyte solution.

6. The method of claim 5 wherein said anode is platinum and said cathode is liquid mercury.

7. The method of claim 5 wherein said solvent is aprotic.

8. The method of claim 5 wherein said homopolymerization is run at 20–85° C. for 1/4–5 hours.

References Cited

UNITED STATES PATENTS 3,140,276  7/1964  Forster _____ 204—59

FOREIGN PATENTS 566,274  11/1958  Canada.

HOWARD S. WILLIAMS, *Primary Examiner.*

UNITED STATES PATENT OFFICE
CERTIFICATE OF CORRECTION

Patent No. 3,427,233 February 11, 1969

Chappelle C. Cochrane

It is certified that error appears in the above identified patent and that said Letters Patent are hereby corrected as shown below:

Column 1, line 66, "p-toulene" should read -- p-toluene --; line 67, "tetraethyl" should read -- tetramethyl --; line 68, "tetraethyl" should read -- tetramethyl --.

Signed and sealed this 5th day of May 1970.

(SEAL)
Attest:

Edward M. Fletcher, Jr.
Attesting Officer

WILLIAM E. SCHUYLER, JR.
Commissioner of Patents